United States Patent
Weinberg

(10) Patent No.: US 8,586,673 B2
(45) Date of Patent: Nov. 19, 2013

(54) FIRE RESISTANT, HIGH FLOW POLY(ARYL ETHER SULFONE) COMPOSITION

(75) Inventor: Shari A. Weinberg, Fulton, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 90 days.

(21) Appl. No.: 12/990,805

(22) PCT Filed: May 7, 2009

(86) PCT No.: PCT/EP2009/055513
§ 371 (c)(1), (2), (4) Date: Nov. 3, 2010

(87) PCT Pub. No.: WO2009/135893
PCT Pub. Date: Nov. 12, 2009

(65) Prior Publication Data
US 2011/0060093 A1    Mar. 10, 2011

Related U.S. Application Data

(60) Provisional application No. 61/051,746, filed on May 9, 2008.

(51) Int. Cl.
C08L 81/06    (2006.01)
C08G 75/23    (2006.01)

(52) U.S. Cl.
CPC .............. C08L 81/06 (2013.01); C08G 75/23 (2013.01)
USPC ........... 525/150; 525/189; 525/199; 525/200; 525/535

(58) Field of Classification Search
USPC ................. 525/150, 535, 189; 528/373, 391
IPC .................................. C08L 81/06; C08G 75/23
See application file for complete search history.

(56) References Cited

U.S. PATENT DOCUMENTS

| | | | |
|---|---|---|---|
| 4,380,618 A | 4/1983 | Khan et al. | |
| 5,164,466 A * | 11/1992 | El-Hibri et al. | 525/537 |
| 5,204,400 A | 4/1993 | Kelly et al. | |
| 5,223,343 A | 6/1993 | Tannenbaum | |
| 5,244,975 A | 9/1993 | Asai et al. | |
| 5,916,958 A | 6/1999 | Kelly et al. | |
| 6,075,100 A * | 6/2000 | El-Hibri | 525/535 |
| 6,433,071 B1 * | 8/2002 | Arai et al. | 524/508 |
| 8,110,639 B2 * | 2/2012 | Schwab et al. | 525/535 |
| 2003/0049485 A1 * | 3/2003 | Brupbacher et al. | 428/615 |
| 2004/0071987 A1 * | 4/2004 | Bate | 428/447 |
| 2004/0253387 A1 | 12/2004 | Cavero | |
| 2007/0037928 A1 * | 2/2007 | Weinberg | 525/189 |
| 2008/0275162 A1 | 11/2008 | Schwab et al. | |

FOREIGN PATENT DOCUMENTS

| | | | |
|---|---|---|---|
| EP | 0444589 A1 | | 9/1991 |
| EP | 1177256 B1 | | 2/2002 |
| JP | 07228743 A | * | 8/1995 |
| JP | 2004095776 A | | 7/2004 |
| WO | WO 9115539 A1 | | 10/1991 |
| WO | WO 2004081103 A2 | | 9/2004 |
| WO | WO 2006087352 A1 | | 8/2006 |
| WO | WO 2007065867 A1 | | 6/2007 |
| WO | WO 2008059004 A1 | | 5/2008 |
| WO | WO 2008090235 A2 | | 7/2008 |

OTHER PUBLICATIONS

Radel (Design Guide, Solvay Advanced Polymers, 64 pages, Feb. 2004).*
Machine translated English translation of JP 07228743 A (Aug. 1995, 3 pages).*
Boedeker (PTFE, FEP, and PFA Specifications, 2012, 3 pages).*
U.S. Appl. No. 12/466,142, filed May 14, 2009, Thomas H. Schwab.

* cited by examiner

*Primary Examiner* — Ling Choi
*Assistant Examiner* — Brieann R Fink
(74) *Attorney, Agent, or Firm* — Oblon, Spivak, McClelland, Maier & Neustadt, L.L.P.

(57) ABSTRACT

Polymer composition (C) containing (i) a poly(aryl ether sulfone) material (M12) composed of a poly(biphenyl ether sulfone) (P1) and, optionally in addition, a poly(aryl ether sulfone) (P2) containing recurring units with arylene groups linked to each other via a secondary, ternary or quaternary carbon atom, and (ii) a per(halo)fluoropolymer material (M34), composed of a per(halo)fluoropolymer (P3) of which at least 2.0 wt. % of the recurring units are derived from a per(halo)fluoromonomer other than tetrafluoroethylene, and a polytetrafluoroethylene (P4). Shaped article, especially aircraft interior component, comprising the polymer composition (C).

12 Claims, No Drawings

FIRE RESISTANT, HIGH FLOW POLY(ARYL ETHER SULFONE) COMPOSITION

CROSS-REFERENCE TO RELATED APPLICATIONS

The present application is a U.S. national stage application under 35 U.S.C. §371 of International Application No. PCT/EP2009/055513, filed May 7, 2009, which claims the benefit of U.S. application Ser. No. 61/051746, filed May 9, 2008, the whole content of which is herein incorporated by reference for all purposes.

The present invention relates to a new high flow polymer composition comprising a poly(aryl ether sulfone) material and a fluoropolymer material. The new polymer composition exhibits an outstanding balance of properties and is especially well suited for the manufacturing of aircraft interior components.

The terms "high flow" are commonly used by the skilled person to qualify a polymer composition that has a low melt viscosity at high shear rates (typically well above $1000 \text{ s}^{-1}$, up to $10,000 \text{ s}^{-1}$); high flow materials make it possible to mold thin-walled, and consequently light-weight, aircraft interior components.

For several years, the industry, in particular the aircraft industry, has required fire resistant and robust materials for the manufacturing of aircraft interior components such as wall panels, overhead storage lockers, serving trays, seat backs, cabin partitions, and ducts.

Among engineering polymers, poly(biphenyl ether sulfone)s, especially polyphenylsulfones, offer as such a rather attractive combination of properties, especially high stiffness, high toughness, and also a rather high fire resistance and a rather high flowability. For these reasons, they appear to be engineering polymers of premium choice for use as the base ingredient of a polymer composition for the manufacturing of aircraft interior components. Yet, neat poly(biphenyl ether sulfone)s are generally not suitable for the manufacturing of aircraft interior components: materials having both a higher fire resistance and a higher flowability than neat poly(biphenyl ether sulfone)s are generally required by the aircraft industry.

It has already been attempted to increase the fire resistance of poly(biphenyl ether sulfone)s. For example, U.S. Pat. No. 5,204,400 and No. 5,916,958 exemplify various polymer compositions comprising a poly(biphenyl ether sulfone), a polytetrafluoroethylene, and anhydrous zinc borate and/or titanium dioxide ; the compositions of US'400 and US'958 are in general still not suitable for the manufacturing of aircraft interior components because none of the above listed additives (polytetrafluoroethylene, and anhydrous zinc borate and/or titanium dioxide) helps to reduce substantially the melt viscosity.

US 2007/0037928 describes the use of a fluorocarbon polymer comprising recurring units derived from a perfluorinated mono-olefin and a perfluoroalkylvinylether (such as MFA) for lowering the melt viscosity of poly(biphenyl ether sulfone)s and other sulfone polymers, so that poly(biphenyl ether sulfone) compositions exhibiting a flowability as high as desirable by the aircraft industry can be produced. The choice of MFA or the like makes it further possible to provide poly(biphenyl ether sulfone) compositions exhibiting a fire resistance as high as desirable (as otherwise obtainable e.g. by the incorporation of polytetrafluoroethylene). In a particular embodiment of US 2007/0037928, as shown in example 5, the poly(biphenyl ether sulfone) composition may further include a bisphenol A polysulfone, which can also help to reduce the melt viscosity. The compositions of US 2007/0037928, while realizing a substantial progress when compared to the previously available poly(biphenyl ether sulfone) compositions, are still not as performing as desirable for the manufacturing of aircraft interior components because the use of MFA or the like results in a substantial loss of toughness, as measured in terms of maximum load and total energy absorbed to maximum load by the penetration impact DYNATUP® test.

The present invention addresses this problem, by providing a new polymer composition which exhibits surprisingly a unique combination of high fire resistance, high flowability (as high as desirable to make it possible to mold thin-walled, and consequently light-weight, aircraft interior components), high stiffness and high toughness, especially as measured by the DYNATUP® test.

Then, a first aspect of the present invention concerns a polymer composition (C) containing
- between 50 and 100 wt. %, based on the total weight of the polymer composition (C), of a poly(aryl ether sulfone) material (M12), composed of
  - from 55 to 100 wt. %, based on the total weight of the poly(aryl ether sulfone) material (M12), of at least one poly(biphenyl ether sulfone) (P1), and
  - from 45 to 0 wt. %, based on the total weight of the poly(aryl ether sulfone) material (M12), of at least one poly(aryl ether sulfone) (P2) of which more than 50 wt. % of the recurring units are recurring units (R2) containing at least one ether group (—O—), at least one sulfone group (—SO$_2$—) and at least two arylene groups linked to each other via a secondary, ternary or quaternary carbon atom, and
- between 0 and 25 wt. %, based on the total weight of the polymer composition (C), of a per(halo)fluoropolymer material (M34), composed of
  - from 5 to 95 wt. %, based on the total weight of the per(halo)fluoropolymer material (M34), of at least one per(halo)fluoropolymer (P3) of which at least 2.0 wt. % of the recurring units are recurring units (R3) derived from at least one per(halo)fluoromonomer other than tetrafluoroethylene, and
  - from 95 to 5 wt. %, based on the total weight of the per(halo)fluoropolymer material (M34), of at least one polytetrafluoroethylene (P4).

The Poly(Aryl Ether Sulfone) Material (M12)

As previously mentioned, the polymer composition (C) contains a poly(aryl ether sulfone) material (M12).

For the purpose of the invention, a poly(aryl ether sulfone) material is intended to denote one or more poly(aryl ether sulfone)s, i.e. one or more polycondensation polymers of which more than 50 wt. % of the recurring units contain at least one ether group (—O—), at least one sulfone group (—SO$_2$—) and at least one arylene group.

The poly(aryl ether sulfone) material (M12) is contained in the polymer composition (C) in an amount of preferably more than 75 wt. %, and more preferably more than 90 wt. %, based on the total weight of polymer composition (C). On the other hand, the weight of the poly(aryl ether sulfone) material (M12), based on the total weight of polymer composition (C), is preferably below 98%, more preferably below 96% and still more preferably below 94%.

The poly(biphenyl ether sulfone) (P1) is contained in the poly(aryl ether sulfone) material (M12) in an amount of from 55 to 100 wt. %, based on the total weight of the poly(aryl ether sulfone) material (M12). The weight of the poly(biphenyl ether sulfone) (P1), based on the total weight of the poly(aryl ether sulfone) material (M12) [i.e. the weight of the poly(biphenyl ether sulfone) (P1) plus the weight of poly(aryl ether sulfone) (P2)], is preferably of at least 65% and more preferably at least 75%. The weight of the poly(biphenyl ether sulfone) (P1), based on the total weight of the poly(aryl ether sulfone) material (M12), may be of at least 85% or at least 90%.

Especially when extremely high toughness is desirable, the weight of the poly(biphenyl ether sulfone) (P1), based on the total weight of the poly(aryl ether sulfone) material (M12), is preferably of at least 95% or of at least 99%; good results were obtained when the poly(aryl ether sulfone) material (M12) consisted essentially of (or even, consisted of) the poly(biphenyl ether sulfone) (P1).

On the other hand, when extremely high flowability is desirable, the weight of the poly(biphenyl ether sulfone) (P1), based on the total weight of the poly(aryl ether sulfone) material (M12), is preferably below 95%; otherwise said, in such a case, the weight of the poly(aryl ether sulfone) (P2), based on the total weight of the poly(aryl ether sulfone) material (M12), is preferably above 5%; it is more preferably above 10% and still more preferably above 15%.

The Poly(Biphenyl Ether Sulfone) (P1)

The poly(aryl ether sulfone) material (M12) contains at least one poly(biphenyl ether sulfone) (P1).

For the purpose of the invention, a poly(biphenyl ether sulfone) is intended to denote a polycondensation polymer of which more than 50 wt. % of the recurring units are recurring units (R1) contain at least one ether group (—O—), at least one sulfone group (—SO$_2$—) and at least one p-biphenylene group:

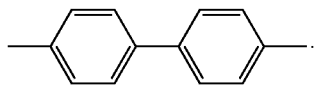

Preferably, recurring units (R1) comply with the general structural formula:

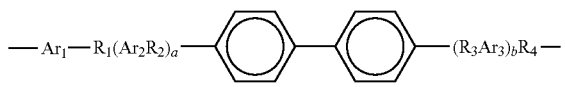

wherein R$_1$ through R$_4$ are —O—, —SO$_2$—, —S—, —CO—, with the proviso that at least one of R$_1$ through R$_4$ is —SO$_2$— and at least one of R$_1$ through R$_4$ is —O—; Ar$_1$, Ar$_2$ and Ar$_3$ are arylene groups containing 6 to 24 carbon atoms, and are preferably phenylene or p-biphenylene; and a and b are either 0 or 1.

More preferably, recurring units (R1) are selected from the group consisting of:

Still more preferably, recurring units (R1) are

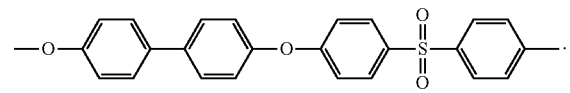

Optionally, the poly(biphenyl ether sulfone) (P1) further comprises recurring units (R1*) other than recurring units (R1).

Recurring units (R1*) may be selected from the group consisting of:

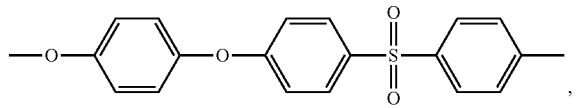

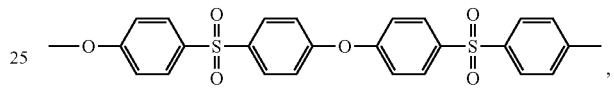

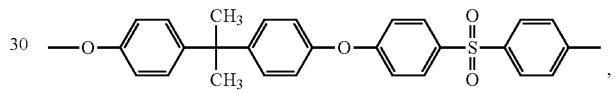

and mixtures thereof.

The poly(biphenyl ether sulfone) (P1) may notably be a homopolymer, a random, alternating or block copolymer.

Preferably more than 70 wt. % and more preferably more than 90 wt. % of the recurring units of the poly(biphenyl ether sulfone) (P1) are recurring units (R1). Still more preferably, essentially all the recurring units (or even, all the recurring units) are recurring units (R1).

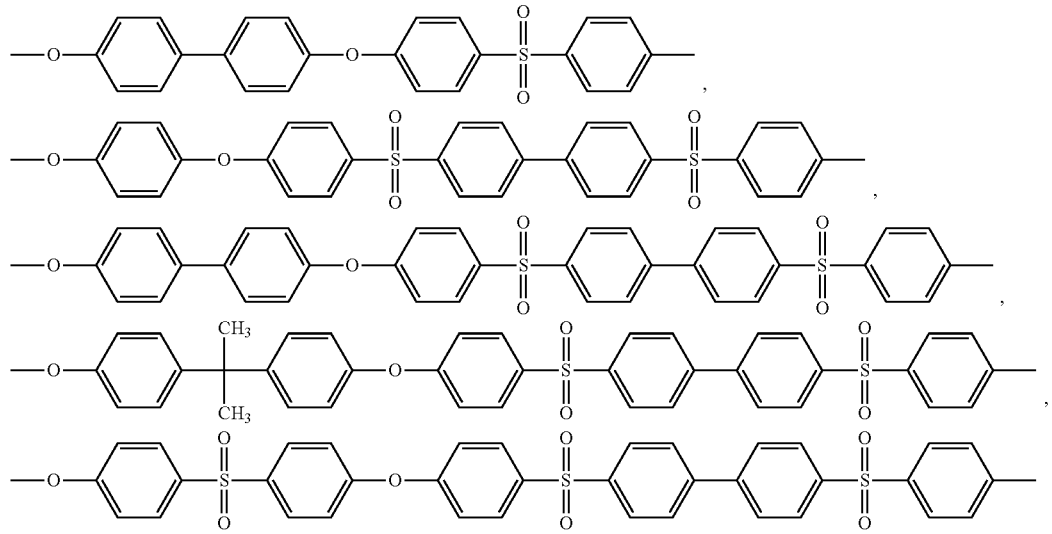

and mixtures thereof.

Good results were obtained with homopolymers the recurring units (R1) of which were of formula:

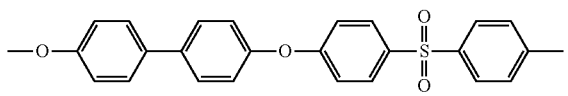

RADEL® R polyphenylsulfones from Solvay Advanced Polymers, L.L.C. is an example of the above homopolymer.

The Poly(Aryl Ether Sulfone) (P2)

More than 50 wt. % of the recurring units are recurring units (R2) containing at least one ether group (—O—), at least one sulfone group (—SO$_2$—) and at least two arylene groups linked to each other via a secondary, ternary or quaternary carbon atom.

For the sake of clarity, a secondary carbon atom denotes a carbon atom bonded to two other carbon atoms with single bonds and to two hydrogen atoms, a ternary carbon atom denotes a carbon atom bonded to three other carbon atoms with single bonds ant to one hydrogen atom, and a quaternary carbon atom denotes a carbon atom bonded to four other carbon atoms with single bonds.

The two arylene groups linked to each other via a secondary, ternary or quaternary carbon atom are preferably linked to each other via a ternary or quaternary carbon atom; more preferably, they are linked to each other via a quaternary atom.

In the recurring units (R2), the secondary, ternary or quaternary carbon atom link advantageously the two arylene groups to each other as schemed below:

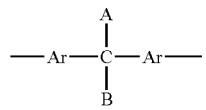

where A and B may be the same or different. A and B can notably be, independently from each other selected from the group consisting of hydrogen, hydroxyl, hydroxyalkyls, hydroxyaralkyls, alkoxys, aralkyloxys, amino, aminoalkyls, aminoaralkyls, alkyls (such as methyl, ethyl, butyls), aralkyls (such as benzyl), halogens (in particular, fluorine), halogenated alkyl groups (in particular, trifluoromethyl), halogenoaralkyls, and alkyl and aralkyl groups substituted by carboxylic acid functions, ester functions, amido functions, aldehyde groups and/or ketone groups, and mixtures thereof.

A and B are preferably identical to each other. Besides, A and B are preferably alkyl groups.

More preferably, A is a methyl group and B is also a methyl group.

The recurring units (R2) are preferably selected from the group consisting of:

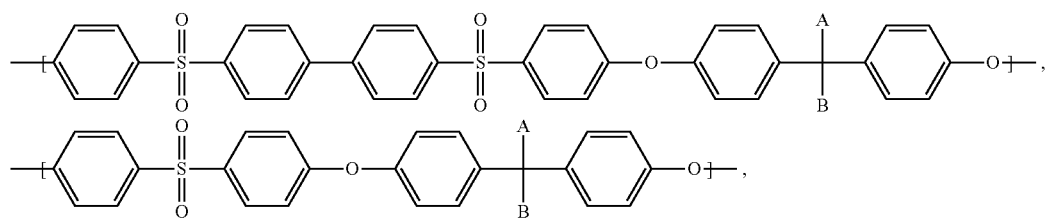

and mixtures thereof.

More preferably, the recurring units (R2) are of the general structural formula:

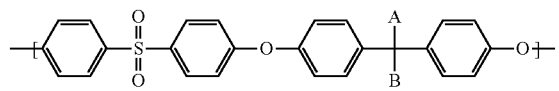

Still more preferably, the recurring units (R2) are of the formula:

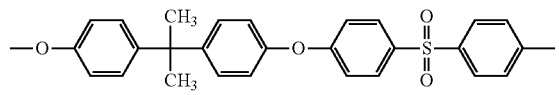

Optionally, the poly(aryl ether sulfone) (P2) further comprises recurring units (R2*) other than recurring units (R2).

Recurring units (R2*) may be selected from the group consisting of:

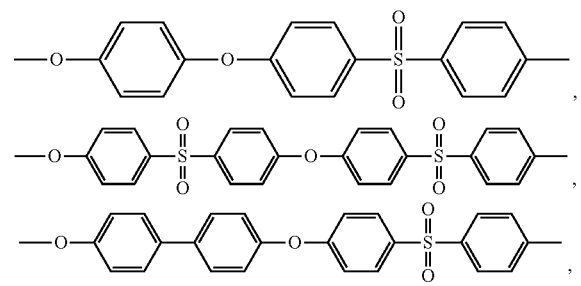

and mixtures thereof.

Preferably more than 70 wt. % and more preferably more than 90 wt. % of the recurring units of the poly(aryl ether sulfone) (P2) are recurring units (R2). Still more preferably, the poly(aryl ether sulfone) (P2) is a homopolymer of recurring units (R2), essentially all the recurring units (or even, all the recurring units) are recurring units (R2).

Good results were obtained with homopolymers the recurring units (R2) of which were of the formula:

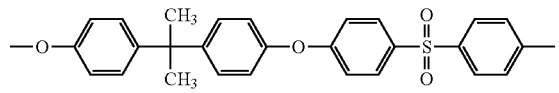

UDEL® bisphenol A polysulfones from Solvay Advanced Polymers, L.L.C. are examples of the above homopolymers.

The Per(Halo)Fluoropolymer Material (M34)

As previously mentioned, the polymer composition (C) contains a per(halo)fluoropolymer material (M34).

For the purpose of the invention, a per(halo)fluoropolymer material is intended to denote one or more per(halo)fluoropolymers, i.e. one or more polyaddition polymers of which at least 98.0 wt. % of the recurring units are derived from at least one per(halo)fluoromonomer.

For the purpose of the invention, a per(halo)fluoromonomer is intended to denote any ethylenically unsaturated monomer comprising at least two carbon atoms and at least one fluorine atom, and which is free of hydrogen atom directly linked to a carbon atom (i.e. linked to a carbon atom through a single bond C—H).

The per(halo)fluoromonomer may further comprise, in addition to the carbon and the fluorine atom(s), at least one halogen atom other than fluorine; thus, the per(halo)fluoromonomer may further comprise at least one chlorine atom, and/or at least one bromine atom, and/or at least one iodine atom. Alternatively, the per(halo)fluoromonomer may be free of halogen atom other than fluorine; when this condition is met, the per(halo)fluoromonomer is herein called "perfluoromonomer".

The per(halo)fluoromonomer may also further comprise at least one heteroatom other than a halogen atom; in particular, it may further comprise at least one oxygen atom, phosphorus atom and/or nitrogen atom.

The per(halo)fluoromonomer may also further comprise at least one hydrogen atom linked to a heteroatom; in particular, it may further at least one hydrogen atom linked to an oxygen atom, a phosphorus atom or a nitrogen atom.

The case being, the hydrogen atom and the heteroatom form part of a functional group such as —OH, —NH$_2$, —C(=O)OH, —C(=O)NH$_2$, —SO$_3$H, —SO$_2$H, —PO$_3$H$_2$ or —PO$_2$H$_2$. Yet, it is preferred that per(halo)fluoromonomer be free of any hydrogen atom.

The per(halo)fluoropolymer may be free of recurring units derived from at least one monomer other than a per(halo)fluoromonomer. Alternatively, the per(halo)fluoropolymer may further comprise up to 2.0 wt. % of recurring units derived from at least one ethylenically unsaturated monomer other than a per(halo)fluoromonomer.

As examples of ethylenically unsaturated monomers other than per(halo)fluoromonomers, it can be notably cited:
ethylene, propylene and $C_4$-$C_{12}$ mono-olefins,
non fluorinated perhalogenated mono-olefins such as tetrabromoethylene and hexabromopropylene,
partially fluorinated mono-olefins such as vinylidene fluoride and trifluoroethylene, and
partially halogenated, non fluorinated mono-olefins such as vinylidene chloride.

The per(halo)fluoropolymer may notably be a homopolymer, a random, alternating or block copolymer.

The per(halo)fluoropolymer material (M34) is contained in the polymer composition (C) in an amount of usually more than 0.1 wt. %, preferably more than 1.0 wt. %, more preferably more than 2.0 wt. % and still more preferably more than 3.0 wt. %, based on the total weight of polymer composition (C). On the other hand, the weight of the per(halo)fluoropolymer material (M34), based on the total weight of polymer composition (C), is preferably below 12.0%, more preferably below 8.0%; it is still more preferably below 5.5%, or below 5.0%, or below 4.5%; the most preferably, it is below 4.0%.

The per(halo)fluoropolymer (P3) is contained in the per(halo)fluoropolymer material (M34) in an amount of from 5 to 95 wt. %, based on the total weight of the per(halo)fluoropolymer material (M34). The weight of the per(halo)fluoropolymer (P3), based on the total weight of the per(halo)fluoropolymer material (M34) [i.e. the weight of the per(halo)fluoropolymer (P3) plus the weight of the polytetrafluoroethylene (P4)], is preferably of at least 25%, more preferably of at least 40%, still more preferably of at least 50% and the most preferably of at least 55%. On the other hand, the weight of the per(halo)fluoropolymer (P3), based on the total weight of the per(halo)fluoropolymer material (M34) is preferably of at most 85%, more preferably of at most 75%, still more preferably of at most 70% and the most preferably of at most 60%.

The Per(Halo)Fluoropolymer (P3)

The per(halo)fluoropolymer (P3) is a per(halo)fluoropolymer (as above defined) of which at least 2.0 wt. % of the recurring units are recurring units (R3) derived from at least one per(halo)fluoromonomer (as above defined) other than tetrafluoroethylene.

Preferably at least 3.0 wt. %, more preferably at least 5.0 wt. % and still more preferably at least 7.0 wt. % of the recurring units of the per(halo)fluoropolymer (P3) are recurring units (R3).

Essentially all, or even all, the recurring units of the per(halo)fluoropolymer (P3) may be recurring units (R3). However, in an advantageous manner, the per(halo)fluoropolymer (P3) contains a substantial weight amount of recurring units other than recurring units (R3). Preferably at most 50 wt. %, more preferably at most 30 wt. %, still more preferably at most 25 wt. %, and the most preferably at most 20 wt. % of the recurring units of the per(halo)fluoropolymer (P3) are recurring units (R3).

The at least one per(halo)fluoromonomer from which the recurring units (R3) are derived is advantageously selected from the group consisting of:
$C_3$-$C_8$ perfluoro-olefins, such as hexafluoropropylene (HFP) and octafluorobutenes;
$C_2$-$C_8$ perhalo-olefins containing at least one fluorine atom and at least one halogen atom other than fluorine (such as chlorine, bromine or iodine), in particular chlorotrifluoroethylene (CTFE);
perhaloalkylvinylethers containing at least one fluorine atom complying with general formula $CY_2$=$CYOR_{f1}$ in which each Y represents a halogen atom (preferably, a fluorine atom) and $R_{f1}$ is a $C_1$-$C_6$ perhaloalkyl (i.e. a $C_1$-$C_6$ alkyl group wherein each hydrogen atom has been replaced by a halogen atom), such as —$CF_3$, —$C_2F_5$, —$C_3F_7$, —$CBr_3$, —$CF_2Br$, —$CF_2Cl$ or —$CF_2I$;
perhalo-oxyalkylvinylethers containing at least one fluorine atom complying with general formula $CY_2$=$CYOX_{01}$ in which each Y represents a halogen atom (preferably, a fluorine atom) and $X_{01}$ is a $C_1$-$C_{12}$ perhalo-oxyalkyl group (i.e. a $C_1$-$C_{12}$ oxyalkyl group wherein each hydrogen atom has been replaced by a halogen atom) including one or more ether groups, such as perfluoro-2-propoxy-propyl and perbromo-2-propoxy-propyl;
functional perhalo-oxyalkylvinylethers containing at least one fluorine atom complying with general formula $CY_2$=$CYOX_{02}$ in which each Y represents a halogen atom (preferably, a fluorine atom) and $X_{02}$ is a $C_1$-$C_{12}$ perhalo-oxyalkyl group (preferably, a perfluoro-oxyalkyl group) including one or more ether groups, said perhalo-oxyalkyl group being substituted by at least one functional group, said functional group comprising preferably, as sole carbon atoms, (i) at least one atom chosen from hydrogen, sodium, potassium, lithium, rubidium, caesium, fluorine, chlorine, bromine and iodine, (ii) at least one heteroatom chosen from oxygen, nitrogen, sulphur and phosphorus, and, optionally in addition, (iii) at least one carbon atom, such as —OH, —NH$_2$, —C(=O)OH, —C(=O)NH$_2$, —SO$_3$H, —SO$_2$H, —PO$_3$H$_2$, —PO$_2$H$_2$ and their homologous wherein one or more of the hydrogen atoms are substituted by a halogen atom or an alkali metal atom such as —SO$_3$Na, —SO$_3$F, —C(=O)ONa and —C(=O)OF;

perhalo-methoxy-alkylvinylethers containing at least one fluorine atom complying with general formula CY$_2$=CYOCY$_2$OR$_{f2}$ in which each Y represents a halogen atom (preferably, a fluorine atom) and R$_{f2}$ is a C$_1$-C$_6$ perhaloalkyl (such as —CF$_2$Br) or a C$_1$-C$_{12}$ perhalooxyalkyl including one or more ether groups (such as —C$_2$F$_5$—O—CF$_2$Br) and R$_{f2}$ is preferably a C$_1$-C$_6$ perfluoroalkyl (such as —CF$_3$) or a C$_1$-C$_{12}$ perfluoro-oxyalkyl including one or more ether groups (such as —C$_2$F$_5$—O—CF$_3$);

perhalodioxoles containing at least one fluorine atom, of general formula:

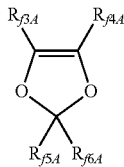

wherein R$_{f3A}$, R$_{f4A}$, R$_{f5A}$, R$_{f6A}$, equal to or different from each other, are independently selected from the group consisting of halogen atoms, C$_1$-C$_6$ perhaloalkyls (e.g. —CF$_2$Br) and C$_1$-C$_6$ perhaloalkyls including one or more oxygen atoms (such as —OCF$_2$Br or —OCF$_2$CF$_2$OCF$_2$Br); it is understood that, since the perhalodioxoles of interest contain at least one fluorine atom, this one must be included in at least one of R$_{f3A}$, R$_{f4A}$, R$_{f5A}$ and R$_{f6A}$; preferably, R$_{f3A}$, R$_{f4A}$, R$_{f5A}$ and R$_{f6A}$, equal to or different from each other, are independently selected from the group consisting of fluorine, C$_1$-C$_6$ perfluoroalkyls (e.g. —CF$_3$, —C$_2$F$_5$, —C$_3$F$_7$) and C$_1$-C$_6$ perfluoroalkyls including one or more oxygen atoms (such as —OCF$_3$ or —OCF$_2$CF$_2$OCF$_3$), and mixtures thereof.

Preferably, the per(halo)fluoromonomer from which the recurring units (R3) are derived is a perfluoromonomer selected from the group consisting of:

C$_3$-C$_8$ perfluoro-olefins, such as hexafluoropropene (HFP);

perfluoroalkylvinylethers complying with general formula CF$_2$=CFOR$_{f7}$ in which each R$_{f7}$ is a C$_1$-C$_6$ perfluoroalkyl (i.e. a C$_1$-C$_6$ alkyl group wherein each hydrogen atom has been replaced by a fluorine atom), such as —CF$_3$, —C$_2$F$_5$ or —C$_3$F$_7$;

perfluoro-oxyalkylvinylethers complying with general formula CF$_2$=CFOX$_{O3}$ in which X$_{O3}$ is a C$_1$-C$_{12}$ perfluorooxyalkyl group (i.e. a C$_1$-C$_{12}$ oxyalkyl group wherein each hydrogen atom has been replaced by a fluorine atom) including one or more ether groups, such as perfluoro-2-propoxy-propyl; and mixtures thereof.

More preferably, the per(halo)fluoromonomer from which the recurring units (R3) are derived is a perfluoroalkylvinylether.

Still more preferably, the per(halo)fluoromonomer from which the recurring units (R3) are derived is selected from the group consisting of perfluoromethylvinylether (CF$_2$=CFOCF$_3$), perfluoroethylvinylether, perfluoropropylvinylether, and mixtures thereof.

The most preferably, the per(halo)fluoromonomer from which the recurring units (R3) are derived is perfluoromethylvinylether (CF$_2$=CFOCF$_3$).

The per(halo)fluoropolymer (P3) may be free of recurring units derived from tetrafluoroethylene. However, in an advantageous manner, the per(halo)fluoropolymer (P3) contains a substantial weight amount of recurring units derived from tetrafluoroethylene; said substantial weight amount may be for example of at least 10 wt. %, at least 20 wt. %, at least 30 wt. % or at least 40 wt. %, based on the total weight of the recurring units of the per(halo)fluoropolymer (P3). Preferably at least 50 wt. %, more preferably at least 70 wt. %, still more preferably at least 75 wt. %, and the most preferably at least 80 wt. % of the recurring units of the per(halo)fluoropolymer (P3) are derived from tetrafluoroethylene.

On the other hand, at most 98.0 wt. %, preferably at most 97.0 wt. %, more preferably at most 95.0 wt. %, and still more preferably at most 93.0 wt. % of the recurring units of the per(halo)fluoropolymer (P3) are derived from tetrafluoroethylene.

While the per(halo)fluoropolymer (P3) may contain up to 2.0 wt. % of recurring units derived from at least one ethylenically unsaturated monomer other than a per(halo)fluoromonomer, such recurring units, if present, constitute at most 1.0 wt. % of the recurring units of the per(halo)fluoropolymer (P3), and, very preferably, the per(halo)fluoropolymer is essentially free (or even, completely free) of recurring units derived from at least one monomer other than a per(halo)fluoromonomer.

The per(halo)fluoropolymer (P3) may notably be a homopolymer, a random, alternating or block copolymer. The per(halo)fluoropolymer (P3) is preferably a copolymer, in particular a random copolymer, essentially all the recurring units (or even, all he recurring units) are a mix composed of from 2.0% to 50 wt. % of recurring units (R3) derived from at least one per(halo)fluoromonomer other than tetrafluoroethylene and from 50% to 98.0% of recurring units derived from tetrafluoroethylene. Good results were obtained when the per(halo)fluoropolymer (P3) was a copolymer, in particular a random copolymer, essentially all the recurring units (or even, all he recurring units) were a mix composed of from 2.0% to 30 wt. % of recurring units (R3) derived from at least one perfluoroalkylvinylether of general formula CF$_2$=CFOR$_{f7}$ with R$_{f7}$ as above defined and at from 70% to 98.0% of recurring units derived from tetrafluoroethylene. Excellent results were obtained when the per(halo)fluoropolymer (P3) was a copolymer, in particular a random copolymer, essentially all the recurring units (or even, all he recurring units) were a mix composed of from 7.0% to 20 wt. % of recurring units (R3) derived from perfluoromethylvinylether and at from 80% to 93.0% of recurring units derived from tetrafluoroethylene.

The per(halo)fluoropolymer (P3) is advantageously melt-processable. For the purpose of the present invention, the term "melt-processable" means that the per(halo)fluoropolymer (P3) can be readily processed (i.e. fabricated into shaped articles such as films, fibers, tubes, wire coatings and the like) by conventional melt extruding, injecting or casting means. The melt-processability of the per(halo)fluoropolymer (P3) typically requires that its dynamic viscosity, measured at a shear rate of 1 s$^{-1}$ and at a temperature which exceeds its melting point of roughly 30° C. [preferably, at a temperature equal to the melting point of the per(halo)fluoropolymer (P3)+(30±2° C.)], be less than 10$^6$ Pa.s; the dynamic viscosity measurement is made with a controlled strain rheometer, employing an actuator to apply a deforming strain to the sample and a separate transducer to measure the resultant stress developed within the sample, and using the parallel plate fixture; the melting point of the per(halo)fluoropolymer (P3) is determined by differential scanning calorimetry (DSC), at a heating rate of 10° C./min, in accordance with ASTM D 3418, the whole content of which being herein incorporated by reference. The per(halo)fluoropolymer (P3) may have a dynamic viscosity at a shear rate of 1 s$^{-1}$ as measured in the above specified conditions between 10 and 2 000 Pa.s, in particular between 10 and 700 Pa.s.

The Polytetrafluoroethylene (P4)

For the purpose of the present invention, a polytetrafluoroethylene is intended to denote any per(halo)fluoropolymer (as above defined) of which more than 98.0 wt. % of the recurring units are derived from tetrafluoroethylene. Preferably more than 98.5 wt. %, more preferably more than 99.0 wt. % and still more preferably more than 99.5 wt. % of the recurring units of the polytetrafluoroethylene (P4) may be derived from tetrafluoroethylene.

In a certain embodiment, to which the preference may be given, essentially all the recurring units (or even, all the recurring units) of the polytetrafluoroethylene (P4) are derived from tetrafluoroethylene ; the polytetrafluoroethylene (P4) may then be qualified as a "homopolymer".

In another embodiment, to which the preference may also be given, between 0% and 2 wt. % of the recurring units of the polytetrafluoroethylene (P4) are derived from one or more ethylenically unsaturated monomer(s) other than polytetrafluoroethylene. In said other embodiment, preferably between 0% and 0.5 wt. % of the recurring units of the polytetrafluoroethylene (P4) are derived from one or more ethylenically unsaturated monomer(s) other than polytetrafluoroethylene. Said other ethylenically unsaturated monomer(s) may be any of the per(halo)fluoromonomers other than polytetrafluoroethylene previously cited in the present document, and/or ethylene, and/or propylene, and/or any $C_4$-$C_{12}$ mono-olefin, and/or any non fluorinated, perhalogenated mono-olefin, and/or any partially fluorinated mono-olefin and/or any non fluorinated, partially halogenated mono-olefin; said other ethylenically unsaturated monomer(s) is (are) preferably any of the per(halo)fluoromonomers other than polytetrafluoroethylene previously cited in the present document; further, all the preferences expressed here below concerning the nature of the at least one per(halo) fluoromonomer from which the recurring units (R3) are derived, apply, mutatis mutandis, to the presently concerned other ethylenically unsaturated monomer(s) when these ones are also per(halo)fluoromonomers.

The polytetrafluoroethylene (P4) is advantageously selected from the group of the so-known "non fibrillating polytetrafluoroethylenes", also commonly referred to as "low molecular weight polytetrafluoroethylenes" or "low melt viscosity polytetrafluoroethylenes". The case being, it has preferably the thermal stability, chemical inertness, lubricity, and high melting temperature substantially identical to those of high molecular weight polytetrafluoroethylenes having typically a number average molecular weight of above 2,000,000.

The polytetrafluoroethylene (P4) has a number average molecular weight of advantageously below 1,000,000, preferably below 700,000, and more preferably below 500,000. On the other hand, it has a number average molecular weight of advantageously above 50,000. The number average molecular weight of the polytetrafluoroethylene (P4) is generally calculated by measuring the total amount $N_g$ (expressed in moles/kg) of the polytetrafluoroethylene end groups —$CF_2COOH$ and —$CF_2COF$, determined by FT-IR spectroscopy. The number average molecular weight ($M_n$) is calculated by means of the following formula $M_n$=2 000/$N_g$. Gel Permeation Chromatography (GPC) may also be used.

The polytetrafluoroethylene (P4) has advantageously a melt viscosity of below $10^4$ Pa.s, as measured at 372° C. in accordance with the procedure ASTM D1239-52T modified as described in U.S. Pat. No. 4,380,618, the whole content of ASTM D1239-52T and of U.S. Pat. No. 4,380,618 being herein incorporated by reference.

The polytetrafluoroethylene (P4) may be obtained directly by polymerization technique such as described in example 1 of U.S. Pat. No. 5,223,343, the whole content of which is herein incorporated by reference.

Alternatively, the polytetrafluoroethylene (P4) may be obtained from a powder of a polytetrafluoroethylene having a higher number average molecular weight (hereinafter, the "higher molecular weight polytetrafluoroethylene"), by irradiating said powder with an efficient amount of gamma rays and/or electron beam, so as to decrease the number average molecular weight of the higher molecular weight polytetrafluoroethylene down to a value below 1,000,000, preferably below 700,000, and more preferably below 500,000, thereby obtaining an irradiated powder of the polytetrafluoroethylene (P4) as above specified. The higher number average molecular weight polytetrafluoroethylene has typically a number average molecular weight of above 2,000,000, and it is typically polymerized by an emulsion or a suspension polymerization process. With the emulsion polymerization process, a latex comprising essentially spherical sub-micronic particles of the higher number average molecular weight polytetrafluoroethylene, emulsified in a dispersion medium (typically, water) is generally obtained. After coagulation of the sub-micronic particles, a powder composed of particles having a volume weighted mean diameter D(4,3) of from 100 µm to 500 µm micron, as measured by dynamic light scattering (DLS) using a conventional DLS equipment (such as MALVERN Mastersizer 2000), is generally obtained. Said powder of the higher number average molecular weight polytetrafluoroethylene is then in general irradiated with gamma rays, thereby obtaining an irradiated powder of low molecular weight polytetrafluoroethylene. The irradiated powder of the low molecular weight polytetrafluoroethylene (P4) is then milled to obtain finely divided solids as detailed below.

With the suspension polymerization process, a powder composed of particles having a volume weighted mean diameter D(4,3) of from 1.0 mm to 10.0 mm, as measured by DLS using a conventional DLS equipment (such as MALVERN Mastersizer 2000), is generally obtained. Said powders is general irradiated with electron beam, thereby obtaining an irradiated powder of low molecular weight polytetrafluoroethylene. The irradiated powder of the low molecular weight polytetrafluoroethylene (P4) is then milled to obtain finely divided solids as detailed below.

The polytetrafluoroethylene (P4) is advantageously in the form of finely divided solids, and is then commonly referred to as "PTFE micropowder". The finely divided solids have a volume weighted mean diameter D(4,3) of preferably less than 100 µm, more preferably less than 20 µm, still more preferably less than 10 µm and the most preferably less than 5 µm, as measured by DLS using a conventional DLS equipment (such as MALVERN Mastersizer 2000).

The polytetrafluoroethylene (P4) has preferably thermal stability, chemical inertness, lubricity, and high melting temperature similar to high molecular weight polytetrafluoroethylenes.

The polytetrafluoroethylene (P4) is advantageously non-melt-processable. For the purpose of the present invention, the term "non-melt-processable" means that the polytetrafluoroethylene (P4) cannot be readily processed (i.e. fabricated into shaped articles such as films, fibers, tubes, wire coatings and the like) by conventional melt extruding, injecting or casting means. The non-melt-processability of the polytetrafluoroethylene (P4) is generally related with its quite high dynamic viscosity, measured at a shear rate of $1\ s^{-1}$ and at a temperature which exceeds its melting point of roughly 30° C. [preferably, at a temperature equal to the melting point of the polytetrafluoroethylene (P4)+(30±2° C.)], with a controlled strain rheometer as above detailed for the per(halo)fluoropolymer (P3): that high dynamic viscosity is typically of at least $10^6$ Pa.s. As well know by the skilled person, polytetrafluoroethylene has generally no easily discernible melting point; its notional melting point, measured by DSC at a heating rate of 10° C./min (ASTM D 3418) is generally of about 328° C., and polytetrafluoroethylene starts generally to decompose at about 400° C.; even at such a high temperature, polytetrafluoroethylene remains generally in a rigid gel-like state, which prevents it from being readily processed by conventional melt extruding, injecting or casting means.

ALGOFLON® L 206 and L 203 PTFE and POLYMIST® non fibrillating polytetrafluoroethylenes, available from Solvay Solexis, S.p.A., are especially suitable for use as the polytetrafluoroethylene (P4). Other especially suitable non fibrillating polytetrafluoroethylenes are commercially available notably from DuPont as ZONYL® (e.g. ZONYL® MP1600), and from Daikin Industries, Ltd. as LUBLON® (e.g. LUBLON® L-5).

Optional Ingredient(s)

The polymer composition (C) may be composed essentially of (or even, may be composed of) the poly(aryl ether sulfone) material (M12) and the per(halo)fluoropolymer material (M34). Alternatively, the polymer composition (C) may further comprise one or more optional ingredient(s). In rare instances, the weight of the optional ingredient(s), based on the total weight of the polymer composition (C), may be up to 50%; it is however generally below 25%, preferably below 12%, more preferably below 8% and still more preferably below 5.5%.

The optional ingredients are advantageously chosen from ingredients which do not detrimentally affect the beneficial properties of the polymer composition (C).

The selection of particular additional ingredients, and the levels, may depend upon the end use envisioned for the polymer composition (C).

Titanium Dioxide

The polymer composition (C) may be free of titanium dioxide. Yet, preferably, the polymer composition (C) further comprises titanium dioxide.

Any of the available crystalline forms of titanium dioxide may be used, with the rutile form being preferred due to its superior pigment properties.

Titanium dioxide is generally as solid particles, of which the volume weighted mean diameter D(4,3) is preferably below 5.0 μm, as measured by DLS using a conventional DLS equipment (such as MALVERN Mastersizer 2000).

When titanium dioxide is present, its weight, based on the total weight of the polymer composition (C), is preferably above 1.0%, more preferably above 2.0% and still more preferably above 3.0%; on the other hand, the weight of titanium dioxide, based on the total weight of the polymer composition (C), is preferably below 12%, more preferably below 8.0%, still more preferably below 5.5% and the most preferably below 4.0%.

Zinc Oxide

The polymer composition (C) may be free of zinc oxide. Yet, preferably, the polymer composition (C) further comprises zinc oxide.

When zinc oxide is present, its weight, based on the total weight of the polymer composition (C), ranges advantageously between 0.01% and 1.00%. The weight of zinc oxide, based on the total weight of the polymer composition (C), is preferably above 0.10% and more preferably above 0.20%; on the other hand, it is preferably below 0.50% and more preferably below 0.35%.

Optional Polymers

The polymer composition (C) is often free of any polymer other than the polymers (P1), (P2), (P3) and (P4). Yet, in a particular embodiment, the polymer composition (C) may further comprise at least one polymer other than the polymers (P1), (P2), (P3) and (P4), in an amount of generally below 25 wt. %, based on the total weight of the polymer composition (C).

The polymer other than the polymers (P1), (P2), (P3) and (P4) may be selected from the group consisting of: (i) poly(aryl ether sulfone)s other than (P1) and (P2), such as polyetherethersulfones and polyethersulfones; (ii) perbromofluoropolymers such as polytetrabromoethylenes of which more than 98.0 wt. % of the recurring units are derived from tetrabromoethylene; (iii) poly(aryl ether ketone)s such as poly(ether ether ketone)s; (iv) poly(ether imide)s; (v) wholly aromatic polyesters; and (vi) mixtures thereof.

Polyetherethersulfones, as herein defined, are polycondensation polymers of which more than 50 wt. % of the recurring units are:

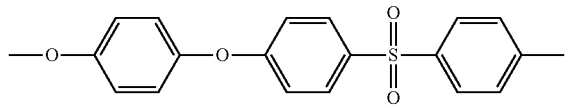

Polyethersulfones, as herein defined, are polycondensation polymers of which more than 50 mol. % of the recurring units are:

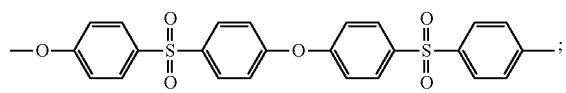

said polyethersulfones may optionally further comprise less than 50 mol. % of recurring units

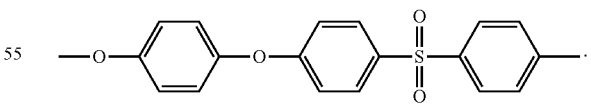

Certain polyethersulfones copolymers are commercially available as RADEL® A from Solvay Advanced Polymers, L.L.C. Polyetherethersulfones homopolymers are also commercially available.

Poly(aryl ether ketone)s, as herein defined, are polycondensation polymers of which more than 50 wt. % of the recurring units contain at least one ether group (—O—), at least one ketone group (—CO—) and at least one arylene group.

Poly(ether ether ketone)s, as herein defined, are polycondensation polymers of which more than 50 wt. % of the recurring units are:

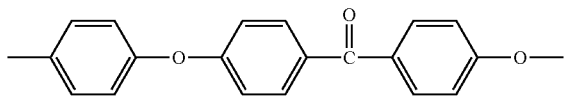

Poly(ether ether ketone)s homopolymers are notably commercially available as KetaSpire® from Solvay Advanced Polymers, L.L.C.

Wholly aromatic polyesters, as herein defined, are polycondensation polymers essentially all (or even, all) the recurring units of which are derived from at least one aromatic diacid and at least one aromatic diol in a mole ratio diacid:diol of about 1.00:1.00, and/or at least one aromatic monoacid—monoalcohol. Wholly aromatic polyesters are notably commercially available as XYDAR® from SOLVAY ADVANCED POLYMERS L.L.C.

Other Optional Ingredients

In certain embodiments of the present invention, the polymer composition (C) further comprises at least one solid filler and/or reinforcing agent, in a weight amount which might be up to 50 wt. %, although being generally below 25 wt. %, based on the total weight of the polymer composition (C). The polymer composition (C) may include at least 1% or at least 10% of the solid filler and/or reinforcing agent.

Fibers which may serve as reinforcing agent include, but are not limited to, glass fibers, graphitic carbon fibers, amorphous carbon fibers, synthetic polymeric fibers, aluminum fibers, aluminum silicate fibers, oxide of metals such as aluminum fibers, titanium fibers, magnesium fibers, wollastonite, rock wool fibers, steel fibers, tungsten fibers, etc. Representative solid fillers include glass, calcium silicate, silica, clays, talc, mica, wollastonite, graphite, aluminum trihydrate, sodium aluminum carbonate, barium ferrite and pigments such as carbon black, iron oxide, cadmium red, iron blue, and the like.

The polymer composition (C) may also further comprise additional ingredients commonly employed in the resin art such as thermal stabilizers, ultraviolet light stabilizers, flame retardants such as zinc borate, smoke suppressants, plasticizers, and the like.

The polymer composition (C) is advantageously prepared by any conventional mixing method. A preferred method comprises dry mixing the ingredients of polymer composition (C) in powder or granular form, using e.g. a mechanical blender, then extruding the mixture into strands and chopping the strands into pellets. Accordingly, the individual ingredients, commonly provided in the form of chips, pellets or powders, can be physically mixed together in an appropriate apparatus such as a mechanical drum tumbler and then optionally dried, if desired, preferably under vacuum or in a circulating air oven, to remove water from the physical mixture so as to facilitate compounding; the composition may then be pelletized, for example by melt extrusion to form a strand which, upon solidification, can be broken up into chips or pellets. It is not necessary to combine all ingredients in a single operation; for example, a pigment-free composition can be compounded first, and melt blended with the desired amounts of pigment, such as $TiO_2$, in a later operation.

A closely related aspect of the present invention is directed to a polymer composition (C') containing
- between 50 and 100 wt. %, based on the total weight of the polymer composition (C'), of a poly(aryl ether sulfone) material (M12), composed of
  - from 55 to 100 wt. %, based on the total weight of the poly(aryl ether sulfone) material (M12), of at least one poly(biphenyl ether sulfone) (P1), and
  - from 45 to 0 wt. %, based on the total weight of the poly(aryl ether sulfone) material (M12), of at least one poly(aryl ether sulfone) (P2) of which more than 50 wt. % of the recurring units are recurring units (R2) containing at least one ether group (—O—), at least one sulfone group (—$SO_2$—) and at least two arylene groups linked to each other via a secondary, ternary or quaternary carbon atom, and
- between 0 and 25 wt. %, based on the total weight of the polymer composition (C'), of a per(halo)fluoropolymer material (M34'), composed of
  - from 5 to 95 wt. %, based on the total weight of the per(halo)fluoropolymer material (M34'), of at least one melt-processable per(halo)fluoropolymer (P3'), and
  - from 95 to 5 wt. %, based on the total weight of the per(halo)fluoropolymer material (M34'), of at least one non-melt-processable per(halo)fluoropolymer (P4').

The polymer composition (C'), the per(halo)fluoropolymer material (M34'), the per(halo)fluoropolymer (P3') and the per(halo)fluoropolymer (P4') comply preferably with any of the above described essential or preferred features of respectively the polymer composition (C), the per(halo)fluoropolymer material (M34), the per(halo)fluoropolymer (P3) and the polytetrafluoroethylene (P4), including but not limited to the nature and amount of each ingredient of the polymer composition (C), with the exception that in the polymer composition (C') the per(halo)fluoropolymer (P3') has to be melt-processable and the per(halo)fluoropolymer (P4') has to be non-melt-processable.

In particular, in the polymer composition (C'), at least 2.0 wt. % of the recurring units of the melt-processable per(halo)fluoropolymer (P3') are preferably recurring units (R3') derived from at least one per(halo)fluoromonomer other than tetrafluoroethylene, and the non-melt-processable per(halo)fluoropolymer (P4') is preferably a polytetrafluoroethylene.

Another aspect of the present invention is directed to a shaped article comprising the polymer composition (C) or (C') as above described. More than 50 wt. % of the invented shaped article may be comprised of the polymer composition (C) or (C'). The invented shaped article may consist essentially of (or may even consist of) the polymer composition (C) or (C'). The invented article may comprise one or more parts. More than 50 wt. % of at least one part the invented shaped article may be comprised of the polymer composition (C) or (C'). The invented shaped article may comprise at least one part consisting essentially of (or even consisting of) the polymer composition (C) or (C').

The invented shaped article is advantageously used notably anywhere where high fire resistance, and/or high flowability (low melt viscosity at high shear rate), for thin-wall parts and consequently for light-weight aircraft interior components), and/or high stiffness and/or high toughness (especially as measured by the DYNATUP® test) are important.

The invented shaped article can be a three-dimensional article, a fiber, a film, a tape, a sheet (which may be suitable for use in laminating and for coating applications) or a slab.

The invented shaped article can be fabricated according to the known methods in the field, for example, forming the article using injection molding or extrusion.

The invented shaped article is preferably an aircraft component, more preferably an aircraft interior component. Still more preferably, it is selected from the group consisting of overhead passenger service units, window reveals, air return grills, wall panels, overhead storage lockers, serving trays, seat backs, cabin partitions, and ducts.

A last aspect of the present invention concerns an aircraft comprising at least one aircraft component. The aircraft component may be any of the above described aircraft components.

EXAMPLES

The following examples demonstrate the huge and unexpected merits of the invented polymer compositions.

Used Ingredients

RADEL® R-5100 NT is a natural grade of polyphenylsulfone homopolymer (PPSU), with a melt flow in the range of 14 to 20 g/10 min measured at a temperature of 365° C. and 5.0 kg load. RADEL® R-5600 NT is also a natural grade of polyphenylsulfone homopolymer (PPSU), with a heat deflection temperature of 236° C. and a melt flow in the range of 20 to 30 g/10 min at 400° C. and under a 1.2 kg load.

Both polyphenylsulfones are commercially available from SOLVAY ADVANCED POLYMERS, L.L.C.

UDEL® P-3703 NT is a natural grade of bisphenol A polysulfone homopolymer (PSU), with a melt flow of about 17 g/10 min measured at 343° C. and under a 2.16 kg load, also commercially available from SOLVAY ADVANCED POLYMERS, L.L.C.

HYFLON® MFA 840 is a tetrafluoroethylene-perfluoromethylvinylether copolymer with a melt flow rate of about 18.3 g/10 min measured according to ASTM Standard D1238, commercially available for SOLVAY SOLEXIS S.p.A.

POLYMIST® F5A is a micronized, non fibrillating polytetrafluoroethylene having a melt flow index of 20 g/10 min measured at 380° C. and under a 21 kg load; it is also commercially available for SOLVAY SOLEXIS S.p.A.

KADOX® 911 is zinc oxide available from Zinc Corporation of America.

Kemira OR-470 is rutile titanium dioxide commercially available from Kemira Chemicals.

Exampified Polymer Compositions 8 polymer compositions were prepared, five as comparative examples (named CE1 to CE5) and three in accordance with the present invention (named E1 to E3). The nature and amount of the ingredients of which these polymer compositions consist are detailed in table 1 hereinafter, together with the results obtained therewith.

Preparation of the Polymer Compositions

All the polymers to be included in the exampified compositions were dried in a dehumidifying oven at 150° C. overnight for approximately 16 hours. The compositions were prepared by tumble blending all the ingredients of the polymer compositions for approximately 30 minutes. The polymer compositions were then extruded using a 25 mm twin screw double vented Berstorff extruder having an L/D ratio of 33:1 at a rate of approximately 25 lb/hr at a screw speed of 200 rpm. The polymer compositions were extruded at a melt temperature of 350° C. The first vent port was open to the atmosphere while the second vent port was connected to a vacuum pump. The strands were then passed through a water trough for cooling and then pelletized.

Test Methods

Standard 3.2 mm (0.125 in) thick ASTM test specimens were molded for tensile, flexural and impact properties.

The tensile properties (yield strength, yield elongation, break elongation and tensile modulus) were measured in accordance with ASTM D-638.

The flexural properties (flexural strength and flexural modulus) were measured in accordance with ASTM D-790.

The notched Izod impact was measured in accordance with ASTM D-256.

The penetration impact Dynatup® Dart Drop test was made in accordance with ASTM D-3763. The maximum load (in lb) and the energy absorbed to maximum load (in ft-lb) were measured.

OSU Heat Release. A heat calorimetry testing methodology developed at Ohio State University, known as the OSU Flammability Test, was used to determine whether the polymer compositions met U.S. government air worthiness standards. The OSU tests measure the two minute total heat release ("2 min THR") and the peak heat release rate ("Maximum HRR"), expressed in kilowatt times minutes per square meter of surface area (kW-min/m$^2$) and kilowatt per square meter of surface area (kW/m$^2$) respectively, for the first five minutes of a burn test under the conditions of the OSU testing. More precisely, the heat release properties of the polymer compositions were evaluated in accordance with FAR 25.853 Amendment 25-83, Appendix F, Part IV. Specimens were prepared by injection molding 6"×6"×0.080" plaques from the compositions in a Mitsubishi molding press. The samples were mounted vertically in an enclosed chamber and exposed to flame by multiple pilots mounted at the top and bottom of the sample fixture. The samples were simultaneously exposed to a radiant heat flux of 3.5 W/cm$^2$ and 85 ft$^3$/min airflow. The heat released during combustion was determined by measuring the difference in temperature of the effluent air from the inlet air.

Rheology. Melt viscosity measurements were made using a Kayeness® capillary rheometer in accordance with ASTM D3835. 20 g samples of the polymer compositions were dried at 160° C. for 2 hours prior to testing. The samples were loaded into the barrel and allowed to melt. A motor driven crosshead with a load transducer used a packing force of 2224 N to drive a piston through a heated steel cylinder maintained at a temperature of 380° C. The sample was forced through a 1.02 mm (0.040 in) diameter, 20.32 mm (0.800 in) long die with an entrance angle of 120° at a controlled rate. The rate and force exerted by the sample were used to calculate the viscosity $\eta_D$ of the polymer composition at each given shear rate (D) tested between 23.2 and 3513 s$^{-1}$ ($\eta_{23.2}$, $\eta_{104}\eta_{23.2}\eta_{498}\eta_{1507}$ and $\eta 3513$).

Results

All the results are listed in table 1 of next page.

ings. If finally successful results could be obtained by the Applicant at the intended, this is notably because the invented

TABLE 1

|  |  | PPSU Based Formulations ||| PPSU + PSU Based Formulations |||||
| --- | --- | --- | --- | --- | --- | --- | --- | --- | --- |
|  |  | CE1 | CE2 | E1 | CE3 | CE4 | CE5 | E2 | E3 |
| Formulations |  |  |  |  |  |  |  |  |  |
| RADEL R-5100 NT | pbw | 94.75 | 94.75 | 96.25 | — | — | — | — | — |
| RADEL R-5600 NT | pbw | — | — | — | 76.25 | 76.25 | 76.25 | 77.45 | 77.45 |
| UDEL P-3703 NT | pbw | — | — | — | 18.5 | 18.5 | 18.5 | 18.8 | 18.8 |
| Hyflon MFA 840 | pbw | — | 5 | 2 | — | 5 | 5 | 2 | 2 |
| Polymist F5A PTFE | pbw | 5 | — | 1.5 | 5 | — | — | 1.5 | 1.5 |
| Kadox 911 Zinc Oxide | pbw | 0.25 | 0.25 | 0.25 | 0.25 | 0.25 | 0.25 | 0.25 | 0.25 |
| All Ingredients but Pigment | pbw | 100 | 100 | 100 | 100 | 100 | 100 | 100 | 100 |
| Kemira TiO2 | pbw | 4 | 4 | 4 | 4 | 4 | 4 | 4 | 4 |
| Test Data | Units |  |  |  |  |  |  |  |  |
| Tensile Properties |  |  |  |  |  |  |  |  |  |
| Yield Strength | psi | 10500 | 10300 | 10500 | 10700 | 9900 | 10400 | 10500 | 10800 |
| Yield Elongation | % | 7.7 | 7.7 | 7.8 | 7.0 | 7.1 | 7.4 | 7.1 | 7.1 |
| Break Elongation | % | 70 | 74 | 66 | 70 | 51 | 88 | 41 | (17)* |
| Tensile Modulus | ksi | 313 | 308 | 310 | 332 | 334 | 304 | 330 | 322 |
| Flexural Properties |  |  |  |  |  |  |  |  |  |
| Flexural Strength | psi | 13900 | 13700 | 13900 | 14600 | 15900 | 13800 | 14500 | 15000 |
| Flexural Modulus | ksi | 356 | 346 | 350 | 358 | 355 | 353 | 362 | 365 |
| Notched Izod Impact | Ft-lb/in | 12.5 | 12.1 | 13.3 | 4.5 | 12.5 | 12.2 | 11.2 | 11.5 |
| Dynatup Dart Drop |  |  |  |  |  |  |  |  |  |
| Maximum Load | lb | 1298 | 1049 | 1328 | 1252 | N/A | 1036 | 1295 | N/A |
| Energy to Maximum Load | Ft-lb | 32 | 21 | 33 | 33 | N/A | 20 | 35 | N/A |
| OSU Heat Release |  |  |  |  |  |  |  |  |  |
| 2 min THR | kW/m$^2$-2-min | −2.8 | −1.8 | −2.7 | −0.8 | 1.2 | 4.9 | 1.9 | 2.5 |
| Maximum HRR | kW/m$^2$ | 36 | 34 | 31 | 33 | 26 | 29 | 34 | 36 |
| Rheology |  |  |  |  |  |  |  |  |  |
| Measured values |  |  |  |  |  |  |  |  |  |
| η at Shear Rate D = 23.2 s−1 | Pa-s | 1388 | 1203 | 1286 | 549 | 609 | 722 | 489 | 557 |
| η at Shear Rate D = 104 s−1 | Pa-s | 1122 | 1152 | 1205 | 498 | 616 | 609 | 493 | 453 |
| η at Shear Rate D = 498 s−1 | Pa-s | 534 | 571 | 591 | 299 | 301 | 372 | 381 | 311 |
| η at Shear Rate D = 1507 s−1 | Pa-s | 325 | 285 | 305 | 210 | 224 | 232 | 226 | 207 |
| η at Shear Rate D = 3512 s−1 | Pa-s | 208 | 131 | 185 | 143 | 120 | 139 | 152 | 138 |

N/A means « not available »
Pbw means « parts by weight »
*The presence of contaminations resulted in an abnormally low value.

Keys to Interpret the Results

These keys, in the form various desirable levels of properties to be achieved, are based on the Applicant's practical high experience and/or the requirements as set forth by its customers, e.g. manufactures of aircraft parts. For a polymer composition to be fully satisfactory, each of its properties should be at a level equal to or higher than the minimum level, as herein defined. Polymer compositions of which one or more of these properties do not reach the desirable levels have substantial chances not to be approved by the end users (as not compliant to the customers' specs), or even to lamentably fail when effectively used in certain practical applications. Certain properties are more important than others ; precisely, herebelow, a symbol (++, + or −) has been mentioned into brackets to the right of each property to indicate how important this property is : "++" means "very important", "+" means "important" and "−" means "of low importance". The nature and amount of each of the ingredients contained in the invented compositions result from complex and careful optimization trials made by the Applicant to achieved the most suitable balance of properties. Given the requirements detailed below, the burden appeared very heavy, with very weak chances of success on the basis of the prior art teachings. If finally successful results could be obtained by the Applicant at the intended, this is notably because the invented polymer compositions exhibited some really unexpected advantageous behaviour, with synergetic effects being observed.

(Tensile) yield strength (++): the desirable level is typically of at least 8,000 psi, with values of at least 10,000 psi being preferred.

Yield elongation (+): the desirable level is typically of at least about 5%.

Break elongation (−): essentially no minimum desirable level.

Tensile modulus (++): the desirable level is typically of at least 250 ksi.

Flexural strength (++): the desirable level is typically of at least 12,000 psi, with values of at least 13,500 psi being preferred.

Flexural modulus (++): the desirable level is typically of at least 300 ksi.

Notched Izod impact (++): it is highly desirable that the polymer composition be "supertough", i.e. that it has a notched Izod impact value of at least 10.0 ft-lb/in.

Maximum load and Energy to Maximum Load at Dynatup Dart Drop test (++): it is highly desirable that the polymer composition exhibits a maximum load of at least 1,100 lb and an energy to maximum load of at least 25 ft-lb ; it is desirable that the polymer composition exhibits a maximum load of at least 1,200 lb and an energy to maximum load of at least 30 ft-lb.

2 min THR and Maximum HRR at OSU Heat Release test (++): the most recent airworthiness standards, enacted in 1990, for engineering thermoplastics require that both 2 min THR and maximum HRR have values of 65 or less ; moreover, in the future, airworthiness standards are likely to become still stricter, leading to a further lowering of permissible THR and/or HRR values; having this in mind, it is desirable that both 2 min THR and maximum HRR have values of 40 or less.

$\eta$ at low shear rate (D=23.2 s$^{-1}$) (-): essentially no maximum desirable level.

$\eta$ at high shear rate (D=3513 s$^{-1}$) (++): it is highly desirable level that $\eta_{3513}$ be below 200 Pa.s; for certain particular applications, especially when extremely thin parts have to be molded, the desirable level for $\eta_{3513}$ is 175 Pa.s or lower.

Interpretation of the Results

PPSU Based Compositions

PTFE-based polymer composition CE1 exhibits a much too high $\eta_{3513}$, which makes it generally improper for manufacturing thin-walled, and consequently light-weight, aircraft interior components.

At the Dynatup test, MFA-based polymer composition CE2 exhibits both a much too low maximum load and a too low energy to maximum load, which makes it inappropriate for use in a high number of applications requiring a very high level of toughness. It is to be further noted that MFA-based polymer compositions CE2 has a tensile strength somewhat lower than that of PTFE-based polymer composition CE1 and the PTFE/MFA-based composition E1.

On the other hand, the PTFE/MFA-based composition E1 (according to the invention) reaches the desirable level for all the properties as above detailed: it exhibits a high stiffness, a high toughness, a high fire resistance and a high flowability. Among all the merits of composition E1, it can be particularly cited its outstanding impact resistance, with a notched Izod impact of 13.3 ft-lb/in, a maximum load at Dynatup test of 1328 lb and an energy to maximum load at the same test of 33 ft-lb, all these properties being surprisingly higher than the same properties of both the PTFE-based polymer composition CE1 and the MFA-based composition CE2 (synergistic behaviour).

PPSU+PSU-based Compositions

PTFE-based polymer composition CE3 exhibits a very bad notched Izod impact (4.5 ft-lb); for this reason, it is unsuitable for use in a high number of applications wherein "super-tough" behaviour is mandatory.

MFA-based polymer compositions CE4 and CE5 exhibits both a much too low maximum load and a much too low energy to maximum load, which makes it also inappropriate for use in a high number of applications requiring a very high level of toughness. It is to be further noted that MFA-based polymer compositions CE4 and CE5 have a tensile strength somewhat lower than that of the PTFE-based polymer composition CE3 and the PTFE/MFA-based compositions E2 and E3.

On the other hand, the PTFE/MFA-based compositions E2 and E3 (according to the invention) attain the desirable level for all the properties as above detailed: they exhibit a high stiffness, a high toughness, a high fire resistance and a high flowability. Among all the merits of the compositions E2 and E3, it can be particularly cited their outstanding impact resistance in both the notched Izod impact and Dynatup tests, with notched Izod impact values of 11.2-11.5 ft-lb/in (to be compared with the poor value measured for CE3), and maximum load values and energy to maximum load values at Dynatup test of respectively 1171-1295 lb and 28-35 ft-lb (to be compared with the poor values measured for CE4 and CE5). It can also be cited its extremely low melt viscosity at high shear rate, identical or close to that of the MFA-based compositions CE4 and CE5 having the highest fluidity.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

Obviously, numerous modifications and variations of the present invention are possible in light of the above teachings. It is therefore to be understood that within the scope of the appended claims, the invention may be practiced otherwise than as specifically described herein.

The invention claimed is:

1. A polymer composition (C), comprising:
   more than 75 wt. % and below 98 wt. %, based on the total weight of the polymer composition (C), of a poly(aryl ether sulfone) material (M12) consisting of at least one poly(biphenyl ether sulfone) (P1), and
   and
   0.1 to 5 wt. %, based on the total weight of the polymer composition (C), of a per(halo)fluoropolymer material (M34) consisting of:
   55 to 75 wt. %, based on the total weight of the per(halo) fluoropolymer material (M34), of at least one per (halo)fluoropolymer (P3) of which at least 2.0 wt. % of the recurring units are recurring units (R3) derived from at least one per(halo)fluoromonomer other than tetrafluoroethylene, and
   45 to 25 wt. %, based on the total weight of the per(halo) fluoropolymer material (M34), of at least one polytetrafluoroethylene (P4).

2. The polymer composition according to claim 1, wherein the weight of the poly(aryl ether sulfone) material (M12), based on the total weight of polymer composition (C), ranges between 90% and 98 wt. %.

3. The polymer composition according to claim 1, wherein essentially all the recurring units of the at least one poly (biphenyl ether sulfone) (P1) are recurring units (R1) of formula:

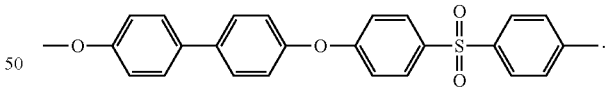

4. The polymer composition according to claim 1, wherein the weight of the per(halo)fluoropolymer material (M34), based on the total weight of polymer composition (C), is 2.0-5.0 wt. %.

5. The polymer composition according to claim 1, wherein the per(halo)fluoropolymer (P3) is a copolymer essentially all the recurring units of which are a mix composed of from 7.0% to 20 wt. % of recurring units (R3) derived from perfluoromethylvinylether and at from 80% to 93.0% of recurring units derived from tetrafluoroethylene.

6. The polymer composition according to claim 1, wherein the polymer composition (C) further comprises titanium dioxide.

7. A shaped article comprising the polymer composition according to claim 1.

8. The shaped article according to claim 7, which is an aircraft interior component.

9. The shaped article according to claim 8, wherein the aircraft interior component is selected from the group consisting of overhead passenger service units, window reveals, air return grills, wall panels, overhead storage lockers, serving trays, seat backs, cabin partitions, and ducts.

10. An aircraft comprising the shaped article according to claim 7.

11. The polymer composition according to claim 1, wherein per(halo)fluoropolymer (P3) is melt-processable and per(halo)fluoropolymer (P4) is nonmelt-processable.

12. The polymer composition according to claim 1, which comprises 0.1-4 wt. %, based on the total weight of the polymer composition (C), of the per(halo)fluoropolymer material (M34).

* * * * *

UNITED STATES PATENT AND TRADEMARK OFFICE
CERTIFICATE OF CORRECTION

PATENT NO. : 8,586,673 B2  
APPLICATION NO. : 12/990805  
DATED : November 19, 2013  
INVENTOR(S) : Shari A. Weinberg Page 1 of 1

It is certified that error appears in the above-identified patent and that said Letters Patent is hereby corrected as shown below:

On the Title Page, above item (74), the Primary Examiner's name should correctly read "Ling-Siu Choi";

In the Claims  
Column 22, line 25, delete "and".

Signed and Sealed this  
Twenty-ninth Day of April, 2014

Michelle K. Lee  
*Deputy Director of the United States Patent and Trademark Office*